United States Patent
Giladi et al.

(10) Patent No.: US 11,303,975 B2
(45) Date of Patent: Apr. 12, 2022

(54) CONTENT SEGMENT VARIANT OBFUSCATION

(71) Applicant: COMCAST CABLE COMMUNICATIONS, LLC, Philadelphia, PA (US)

(72) Inventors: Alexander Giladi, Princeton, NJ (US); Yasser Syed, La Crescenta, CA (US)

(73) Assignee: COMCAST CABLE COMMUNICATIONS, LLC, Philadelphia, PA (US)

( * ) Notice: Subject to any disclaimer, the term of this patent is extended or adjusted under 35 U.S.C. 154(b) by 377 days.

(21) Appl. No.: 15/975,454

(22) Filed: May 9, 2018

(65) Prior Publication Data

US 2018/0352307 A1 Dec. 6, 2018

Related U.S. Application Data

(60) Provisional application No. 62/515,038, filed on Jun. 5, 2017.

(51) Int. Cl.
*H04N 21/8358* (2011.01)
*H04N 19/70* (2014.01)
*H04N 19/169* (2014.01)
*H04N 21/2343* (2011.01)
*H04N 19/467* (2014.01)
(Continued)

(52) U.S. Cl.
CPC ......... *H04N 21/8358* (2013.01); *G06F 21/16* (2013.01); *H04N 19/188* (2014.11); *H04N 19/467* (2014.11); *H04N 19/70* (2014.11); *H04N 21/234345* (2013.01);
(Continued)

(58) Field of Classification Search
CPC .......... H04N 21/8358; H04N 21/8456; H04N 21/26258; H04N 19/70; H04N 19/188; H04N 21/234345; H04N 19/467; G06F 21/16; H04L 2209/16; H04L 63/0428
See application file for complete search history.

(56) References Cited

U.S. PATENT DOCUMENTS 5,949,885 A * 9/1999 Leighton ............ H04N 1/32304
380/54
6,381,341 B1 * 4/2002 Rhoads .............. G06K 9/00442
382/100
(Continued)

FOREIGN PATENT DOCUMENTS

WO WO-2013/144347 10/2013
WO WO-2013/144347 A1 10/2013

OTHER PUBLICATIONS

European Search Report dated Jul. 27, 2018 by the European Patent Office for EP Application No. 18176087.7, filed on Jun. 5, 2018 (Applicant—Comcast Cable Communications, LLC) (7 Pages).

(Continued)

*Primary Examiner* — James R Turchen
(74) *Attorney, Agent, or Firm* — Ballard Spahr LLP (57) ABSTRACT

Described herein are systems and methods for obfuscating variants of content segments. Variants of content segments can be used to encode an identifying sequence in a transmission of content. The duration parameter of a manifest entry can be modified by a random offset. The data size of variants of a given content segment can be equalized by adding one or more portions of data to one or more of the variants.

20 Claims, 6 Drawing Sheets

(51) Int. Cl.
*H04N 21/845* (2011.01)
*H04N 21/262* (2011.01)
*G06F 21/16* (2013.01)
*H04L 29/06* (2006.01)

(52) U.S. Cl.
CPC ... *H04N 21/26258* (2013.01); *H04N 21/8456* (2013.01); *H04L 63/0428* (2013.01); *H04L 2209/16* (2013.01)

(56) References Cited

U.S. PATENT DOCUMENTS

| | | | | |
|---|---|---|---|---|
| 6,546,113 | B1* | 4/2003 | Lucas | G06T 1/0085 382/100 |
| 10,313,721 | B1* | 6/2019 | McLeod | H04N 21/2387 |
| 2002/0094082 | A1* | 7/2002 | Jones | G06T 1/0085 380/219 |
| 2003/0204728 | A1* | 10/2003 | Irwin | H04L 63/1416 713/176 |
| 2004/0039914 | A1* | 2/2004 | Barr | G06T 1/0071 713/176 |
| 2006/0239503 | A1 | 10/2006 | Petrovic et al. | |
| 2007/0174624 | A1* | 7/2007 | Wolosewicz | H04N 21/4331 713/176 |
| 2009/0326961 | A1 | 12/2009 | Petrovic et al. | |
| 2010/0296649 | A1 | 11/2010 | Katzenbeisser et al. | |
| 2012/0030041 | A1* | 2/2012 | Wolosewicz | H04L 12/66 705/14.73 |
| 2014/0270338 | A1* | 9/2014 | Zhao | G06T 1/0071 382/100 |
| 2014/0325550 | A1* | 10/2014 | Winograd | H04N 21/8456 725/19 |
| 2015/0110123 | A1* | 4/2015 | Muller | H04L 47/28 370/412 |
| 2015/0127715 | A1* | 5/2015 | Dankberg | H04L 67/2857 709/203 |
| 2015/0302033 | A1* | 10/2015 | Jarnikov | H04L 65/4084 707/695 |
| 2016/0050074 | A1* | 2/2016 | Romrell | H04N 21/8358 713/176 |
| 2016/0127440 | A1* | 5/2016 | Gordon | H04N 21/2402 709/219 |
| 2017/0118537 | A1* | 4/2017 | Stransky-Heilkron | H04N 21/2362 |
| 2018/0130168 | A1* | 5/2018 | Nayshtut | G09C 5/00 |
| 2018/0167304 | A1* | 6/2018 | Crowder | H04L 43/045 |

OTHER PUBLICATIONS

U.S. Appl. No. 62/515,038, filed Jun. 5, 2017, Alexander Giladi.

* cited by examiner

FIG. 1

```
<SegmentTimeline>
    <S r="2" d="54054143"/>     ─212
210 ╲ <S r="0" d="54053976"/>   ─214
    <S r="2" d="54053959"/>     ─216
    <S r="0" d="54054022"/>     ─218
</SegmentTimeline>
```

FIG. 2A

```
<SegmentTimeline>
    <S r="14" d="54054143"/>    ─222
220 ╲ <S r="4" d="54053976"/>   ─224
    <S r="14" d="54053959"/>    ─226
    <S r="4" d="54054022"/>     ─228
</SegmentTimeline>
```

CONTENT SEGMENT VARIANT OBFUSCATION

CROSS-REFERENCE TO RELATED APPLICATION

This application claims priority to U.S. Provisional Patent Application No. 62/515,038 filed Jun. 5, 2017, hereby incorporated by reference in its entirety.

BACKGROUND

Forensic steganography, or "watermarking," may be used to encode identifiers into a content transmission. The encoded identifiers may serve to identify a source of the content transmission, or a user or device requesting the content transmission. Watermarking is typically implemented by using a sequence of variants of content segments in the content transmission. A variant of a content segment is a different version of a same content segment. A malicious user who is able to identify the use of these variants of content segments may be able to compromise the watermarking. These and other shortcomings are addressed by the methods and systems set forth herein.

SUMMARY

It is to be understood that both the following general description and the following detailed description are exemplary and explanatory only and are not restrictive. Provided are methods and systems for content segment variant obfuscation. A request for content may be received. The content may be encoded as a plurality of content segments.

A variant of a content segment is a different version of a same content segment. For example, two variants of the same content segment may correspond to the same two seconds of content. The variants may differ in some respect that is visually imperceptible to a user, but may nonetheless differentiate the variants. For example, different motion vectors may be used to encode a segment, or minor variations in color may be introduced.

To obfuscate an identifying sequence of the content, a manifest facilitating access to the content segments may be generated. A duration parameter for each entry in the manifest may be modified by a random offset. When a request for a content segment, based on the manifest, is received, one or more least significant bits may be used to identify which variant of a requested content segment should be transmitted to the user. By using random offsets, it is more difficult for a malicious user to identify which entries in the manifest correspond to content segments used in an identifying sequence. Further, the data size of variants of content segments may be equalized to prevent identification of content segments used in the identifying sequence.

Additional advantages will be set forth in part in the description which follows or may be learned by practice. The advantages will be realized and attained by means of the elements and combinations particularly pointed out in the appended claims.

BRIEF DESCRIPTION OF THE DRAWINGS

The accompanying drawings, which are incorporated in and constitute a part of this specification, show embodiments and together with the description, serve to explain the principles of the methods and systems.

DETAILED DESCRIPTION

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Described herein are components that may be used to perform the methods and systems described herein. These and other components are described herein, and it is understood that when combinations, subsets, interactions, groups, etc. of these components are described that while specific reference of each various individual and collective combinations and permutation of these may not be explicitly described, each is specifically contemplated and described herein, for all methods and systems. This applies to all aspects of this application including, but not limited to, steps in the methods described herein. Thus, if there are a variety of additional steps that may be performed it is understood that each of these additional steps may be performed with any specific embodiment or combination of embodiments of the methods described herein.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowcharts of methods, systems, apparatuses and computer program products. It will be understood that each block of the block diagrams and flowcharts, and combinations of blocks in the block diagrams and flowcharts, respectively, may be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that may direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowcharts support combinations of means for performing the specified functions, combinations of steps for performing the specified functions and program instruction means for performing the specified functions. It will also be understood that each block of the block diagrams and flowcharts, and combinations of blocks in the block diagrams and flowcharts, may be implemented by special purpose hardware-based computer systems that perform the specified functions or steps, or combinations of special purpose hardware and computer instructions.

In various examples, this detailed description may refer to content items (which may also be referred to as "content," "content data," "content information," "content asset," "multimedia asset data file," or simply "data" or "information"). In some examples, content items may comprise any information or data that may be licensed to one or more individuals (or other entities, such as business or group). In various embodiments, content may include electronic representations of video, audio, text and/or graphics, which may include but is not limited to electronic representations of videos, movies, or other multimedia, which may include but is not limited to data files adhering to MPEG2, MPEG, MPEG4 UHD, HDR, 4 k, Adobe® Flash® Video (ITV) format or some other video file format whether such format is presently known or developed in the future. In various embodiments, the content items described herein may include electronic representations of music, spoken words, or other audio, which may include but is not limited to data files adhering to the MPEG-1 Audio Layer 3 (.MP3) format, Adobe®, CableLabs 1.0, 1.1, 3.0, AVC, HEVC, H.264, Nielsen watermarks, V-chip data and Secondary Audio Programs (SAP). Sound. Document (.ASND) format or some other format configured to store electronic audio whether such format is presently known or developed in the future. In some cases, content may include data files adhering to the following formats: Portable Document Format (PDF), Electronic Publication (.EPUB) format created by the International Digital Publishing Forum (IDPF), MEG (.JPG) format, Portable Network Graphics (.PNG) format, dynamic ad insertion data (.csv), Adobe® Photoshop® (.PSD) format or some other format for electronically storing text, graphics and/or other information whether such format is presently known or developed in the future. In some embodiments, content items may include any combination of the above-described examples.

In various examples, this detailed disclosure may refer to consuming content or to the consumption of content, which may also be referred to as "accessing" content, "providing" content, "viewing" content, "listening" to content, "rendering" content, or "playing" content, among other things. In some cases, the particular term utilized may be dependent on the context in which it is used. For example, consuming video may also be referred to as viewing or playing the video. In another example, consuming audio may also be referred to as listening to or playing the audio.

Note that in various examples this detailed disclosure may refer to a given entity performing some action. It should be understood that this language may in some cases mean that a system (e.g., a computer) owned and/or controlled by the given entity is actually performing the action.

Described herein are improvements upon a concept of using patterns of watermarks in different fragments of one piece of content. Described herein is a combination of file level obfuscation and manifest level obfuscation. For file level obfuscation, where different types of watermarks, having varying sizes, are added to content fragments of the same size, bytes are added to the fragments with smaller sized watermarks to make fragments appear the same size— to obfuscate possible detection of watermarks by studying segment size variation. The obfuscation at the manifest level includes randomized watermarks.

Described herein is obfuscation of the use of content segment variants in forensic steganography, or "watermarking." A variant of a content segment is a different version of a same content segment. For example, two variants of the same content segment may correspond to the same two seconds of content. The variants may differ in some respect that is visually imperceptible to a user, but may nonetheless differentiate the variants. For example, different motion vectors may be used to encode a segment, or minor variations in color may be introduced. Accordingly, at least a subset of the plurality of content segments may each correspond to a plurality of variants. For example, every Nth content segment may have a first variant, e.g., an "A" variant and a second variant, e.g., a "B" variant. An identifying sequence may be encoded into a transmission of the content as a sequence of "A" or "B" variants of content segments.

Variants of content segments may be used to encode an identifying sequence into a transmission of content. For example, assume content segments have both an "A" variant and a "B" variant. A variant of a content segment at index(i) may be expressed as either A(i) or B(i). An identifying sequence may then be expressed as an ordered sequence of A or B content segments. For example, an identifying sequence BBBA may be expressed beginning at index i as B(i), B(i+1), B(i+2), A(i+3). As another example, the identifying sequence may be encoded into every N segments beginning at index i as B(0+i), B(N+i), B(2N+i), A(3N+i), with content segments other than the every N segments not reflecting the identifying sequence. This identifying sequence may then be encoded into a transmission of content by transmitting the corresponding content segment variants to a user device.

In order to transmit this identifying sequence of content segments variants to a user device, the corresponding content segment variant may be reflected in a manifest used by the user device. Content segments may be named using "time-based" addressing, where a given content segment is named based on its start time in a timeline. For example. For example, assuming a timeline based on a 90 KHz clock and content segments having a duration of one second, content segments may be named as segment_00000.ts, segment_90090.ts, segment_180180.ts. However, these timeline values may be expressed using higher resolution clocks. For example, a 27 MHz clock, such as the MPEG-2 system clock, may express 90 KHz values T as T*300+ext, where "ext" is a 9-bit number from 0-299. Thus, a given content segment named using time-based addressing and a 90 KHz clock may correspond to 300 sequential values of a 27 MHz clock. This increased precision may be used to obfuscate use of watermarking by generating a manifest with duration values configured according to a higher-precision clock than is necessary to address the content segments. The duration parameters may be generated according to a random offset. In the example above with a 27 MHz clock used as a reference for 90 KHz addressed content segments, a given 27 MHz duration may be modified by a random value between [−149 and 149]. This introduced randomization increase the difficulty in identifying whether A or B variants are included in the manifest. One or more least significant bits in the duration parameter of a given manifest entry may be fixed according to which variant the given manifest entry corresponds. Thus, when a request for a given content segment is received, the one or more least significant bits of a time value in the request, generated by the user device based on the duration parameter, may be used to determine which variant to transmit to a user device after the request. For example, given a content segment having an A variant and a B variant, the least significant bit of the time value of the request may be used to determine whether to transmit the A variant or the B variant. For example, if the least significant bit is a 0, the A variant may be transmitted, while if the least significant bit is a 1, the B variant may be transmitted.

The use of watermarking through content segment variants may be further obfuscated by equalizing the data size of all variants of a given content segment. For example, an "A" variant of a given content segment may be encoded at lower data size than a "B" variant of the given content segment. The "A" variant of the given content segment may be padded with additional data such that the "A" variant and the "B" variant of the content segment are of equal size. This provides increased protection against a collusion attack, where multiple copies of a given piece of content having varying identifying sequences encoded in them are combined to create a new version with a removed or compromised watermark. As each variant of a given content segment is of equal data size, it is difficult to discern which content segments are used to encode an identifying sequence by attempting to identify variations in data size.

Figure 1:
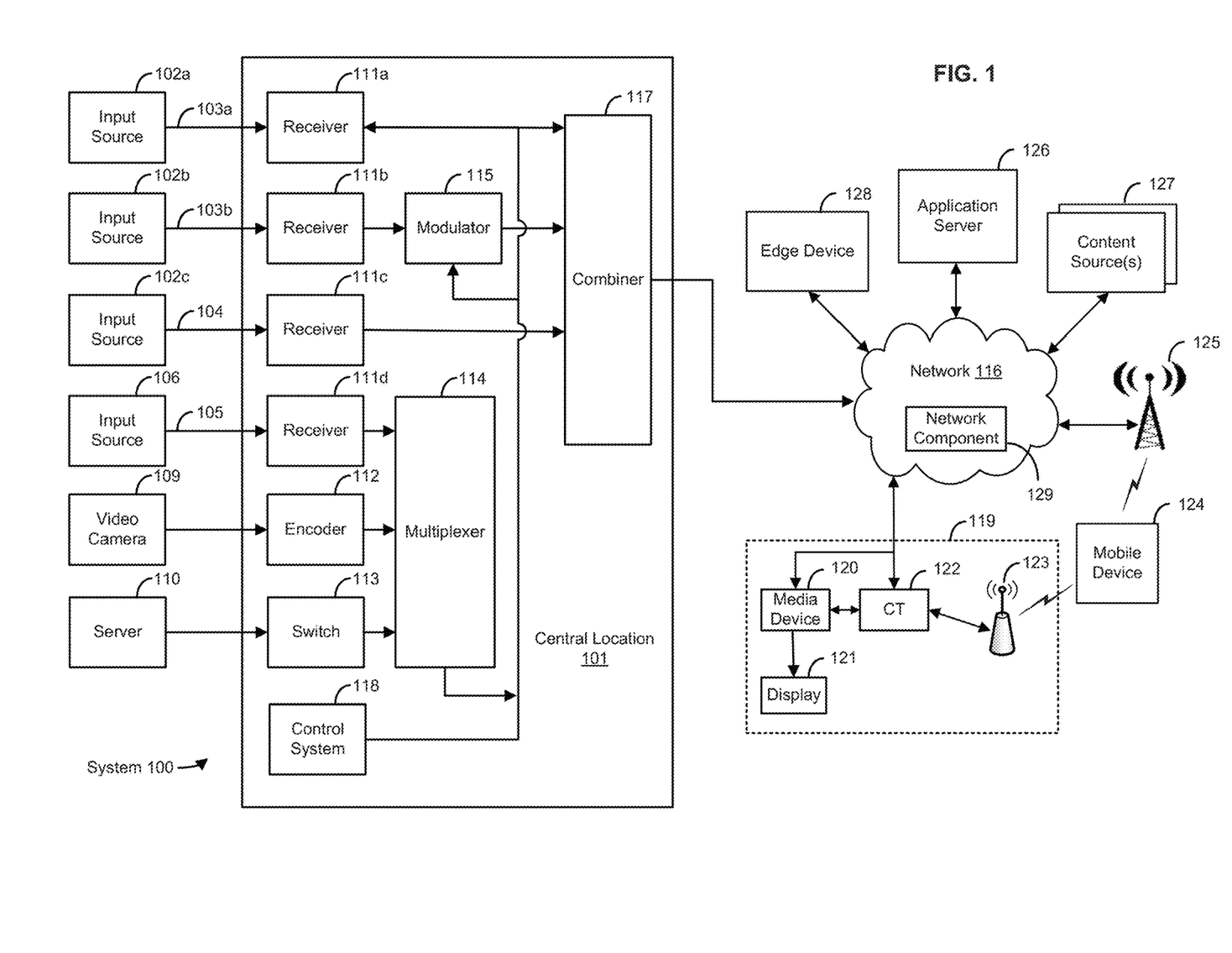
FIG. 1 is a block diagram of a content distribution network.

FIG. 1 shows an example system in which the present methods and systems may operate. Those skilled in the art will appreciate that present methods may be used in systems that employ both digital and analog equipment. One skilled in the art will appreciate that provided herein is a functional description and that the respective functions can be performed by software, hardware, or a combination of software and hardware.

A system 100 may comprise a central location 101 (e.g., a headend), which can receive content (e.g., data, input programming, and the like) from multiple sources. The central location 101 may combine the content from the various sources and can distribute the content to user (e.g., subscriber) locations (e.g., location 119) via a distribution system 116.

In an example, the central location 101 may receive content from a variety of sources 102a, 102b, 102c. The content may be transmitted from the source to the central location 101 via a variety of transmission paths, including wireless (e.g. satellite paths 103a, 103b) and a terrestrial path 104. The central location 101 can also receive content from a direct feed source 106 via a direct line 105. Other input sources can comprise capture devices such as a video camera 109 or a server 110. The signals provided by the content sources can include a single content item or a multiplex that includes several content items.

The central location 101 may comprise one or a plurality of receivers 111a, 111b, 111c, 111d that are each associated with an input source. For example, MPEG encoders such as an encoder 112, are included for encoding local content or a video camera 109 feed. A switch 113 may provide access to the server 110, which can be a Pay-Per-View server, a data server, an interne router, a network system, a phone system, and the like. Some signals may require additional processing, such as signal multiplexing, prior to being modulated. Such multiplexing can be performed by a multiplexer (mux) 114.

The central location 101 may comprise one or a plurality of modulators 115 for interfacing to a network 116. The modulators 115 may convert the received content into a modulated output signal suitable for transmission over a network 116. The output signals from the modulators 115 may be combined, using equipment such as a combiner 117, for input into the network 116. In an example, the network 116 can comprise a content delivery network, a content access network, and/or the like. For example, the network 116 can be configured to provide content from a variety of sources using a variety of network paths, protocols, devices, and/or the like. The content delivery network and/or content access network can be managed (e.g., deployed, serviced) by a content provider, a service provider, and/or the like.

A control system 118 may permit a system operator to control and monitor the functions and performance of the system 100. The control system 118 may interface, monitor, and/or control a variety of functions, including, but not limited to, the channel lineup for the television system, billing for each user, conditional access for content distributed to users, and the like. The control system 118 can provide input to the modulators for setting operating parameters, such as system specific MPEG table packet organization or conditional access information. The control system 118 can be located at the central location 101 or at a remote location.

The network 116 may distribute signals from the central location 101 to user locations, such as a user location 119. The network 116 may comprise an optical fiber network, a coaxial cable network, a hybrid fiber-coaxial network, a wireless network, a satellite system, a direct broadcast system, an Ethernet network, a high-definition multimedia interface network, universal serial bus network, or any combination thereof.

In an example, a multitude of users may be connected to the network 116 at one or more of the user locations. At the user location 119, a media device 120 can demodulate and/or decode, if needed, the signals for display on a display device 121, such as on a television set (TV) or a computer monitor. For example, the media device 120 may comprise a demodulator, decoder, frequency tuner, and/or the like. The media device 120 can be directly connected to the network (e.g., for communications via in-band and/or out-of-band signals of a content delivery network) and/or connected to the network 116 via a communication terminal 122 (e.g., for communications via a packet switched network). The media device 120 may comprise a set-top box, a digital streaming device, a gaining device, a media storage device, a digital recording device, a combination thereof, and/or the like. The media device 120 can comprise one or more applications, such as content viewers, social media applications, news applications, gaming applications, content stores, electronic program guides, and/or the like. Those skilled in the art will appreciate that the signal may be demodulated and/or decoded in a variety of equipment, including the communication terminal 122, a computer, a TV, a monitor, or satellite dish.

In an example, the communication terminal 122 may be located at the user location 119. The communication terminal 122 may be configured to communicate with the network 116. The communications terminal 122 can comprise a modem (e.g., cable modem), a router, a gateway, a switch, a network terminal (e.g., optical network unit), and/or the like. The communications terminal 122 can be configured for communication with the network 116 via a variety of protocols, such as internet protocol, transmission control protocol, file transfer protocol, session initiation protocol, voice over internet protocol, and/or the like. For example, for a cable network, the communication terminal 122 may be configured to provide network access via a variety of communication protocols and standards, such as Data Over Cable Service Interface Specification.

In an example, the user location 119 may comprise a first access point 123, such as a wireless access point. The first access point 123 may be configured to provide one or more wireless networks in at least a portion of the user location 119. The first access point 123 can be configured to provide access to the network 116 to devices configured with a compatible wireless radio, such as a mobile device 124, the media device 120, the display device 121, or other computing devices (e.g., laptops, sensor devices, security devices). For example, the first access point 123 can provide a user managed network (e.g., local area network), a service provider managed network (e.g., public network for users of the service provider), and/or the like. It should be noted that in some configurations, some or all of the first access point 123, the communication terminal 122, the media device 120, and the display device 121 may be implemented as a single device.

In an example, the user location 119 may not be fixed. By way of example, a user may receive content from the network 116 on the mobile device 124. The mobile device 124 may comprise a laptop computer, a tablet device, a computer station, a personal data assistant (PDA), a smart device (e.g., smart phone, smart apparel, smart watch, smart glasses), GPS, a vehicle entertainment system, a portable media player, a combination thereof, and/or the like. The mobile device 124 may communicate with a variety of access points (e.g., at different times and locations or simultaneously if within range of multiple access points). For example, the mobile device 124 can communicate with a second access point 125. The second access point 125 can be a cell tower, a wireless hotspot, another mobile device, and/or other remote access point. The second access point 125 may be within range of the user location 119 or remote from the user location 119. For example, the second access point 125 can be located along a travel route, within a business or residence, or other useful locations (e.g., travel stop, city center, park).

In an example, the system 100 may comprise an application device 126. The application device 126 may be a computing device, such as a server. The application device 126 can provide services related to applications. For example, the application device 126 can comprise an application store. The application store may be configured to allow users to purchase, download, install, upgrade, and/or otherwise manage applications. For example, the application device 126 may be configured to allow users to download applications to a device, such as the mobile device 124, communications terminal 122, the media device 120, the display device 121, and/or the like. The application device 126 can run one or more application services to provide data, handle requests, and/or otherwise facilitate operation of applications for the user.

In an example, the system 100 may comprise one or more content source(s) 127. The content source(s) 127 may be configured to provide content (e.g., video, audio, games, applications, data) to the user. The content source(s) 127 can be configured to provide streaming media, such as on-demand content (e.g., video on-demand), content recordings, and/or the like. For example, the content source(s) 127 can be managed by third party content providers, service providers, online content providers, over-the-top content providers, and/or the like. The content may be provided via a subscription, by individual item purchase or rental, and/or the like. The content source(s) 127 can be configured to provide the content via a packet switched network path, such as via an Internet protocol (IP) based connection. In an example, the content may be accessed by users via applications, such as mobile applications, television applications, set-top box applications, gaming device applications, and/or the like. An example application can be a custom application (e.g., by content provider, for a specific device), a general content browser (e.g., web browser), an electronic program guide, and/or the like.

In an example, the system 100 may comprise an edge device 128. The edge device 128 may be configured to provide content, services, and/or the like to the user location 119. For example, the edge device 128 can be one of a plurality of edge devices distributed across the network 116. The edge device 128 can be located in a region proximate to the user location 119. A request for content from the user may be directed to the edge device 128 (e.g., due to the location of the edge device and/or network conditions). The edge device 128 can be configured to package content for delivery to the user (e.g., in a specific format requested by a user device), provide the user a manifest file (e.g., or other index file describing segments of the content), provide streaming content (e.g., unicast, multicast), provide a file transfer, and/or the like. The edge device 128 can cache or otherwise store content (e.g., frequently requested content) to enable faster delivery of content to users.

The edge device 128 may receive a request for content, e.g. from a user device. The content may comprise a plurality of content segments. Each of the plurality of content segments can comprise a particular duration of content, e.g. one second of content, two seconds of content, or five seconds of content. Each of at least a subset of the plurality of content segments may correspond to a plurality of variants. For example, every Nth content segment in the plurality of content segments can correspond to a plurality of variants, while content segments outside of the every Nth content segment only have one variant. For example, a given content segment may correspond to a first variant, or an "A" variant, and a second variant, or a "B" variant. It is understood that a given content segment can correspond to any quantity of variants. A plurality of variants of a given content segment each express the same portion of content, e.g., a same second of content, a same two seconds of content, or a same five seconds of content, but with some variation introduced to differentiate each variant. The variation can include a variation in motion vectors, color composition, audio composition, or other variation.

The edge device 128 may generate an identifier associated with the request. The edge device 128 may generate an identifier associated with the request after the request for content. The identifier may identify one or more of, a user associated with the request, a user device associated with the request, a source of the content, a time and/or date associated with the request, the content, or data as can be appreciated. The identifier may then be expressed as an identifying sequence based on the variants of content segments. For example, the identifier can comprise a binary value. Each 0 of the binary values can correspond to one variant, e.g., "A," while each 1 of the binary values may correspond to another variant, e.g., "B." For example, the binary value 11001011 can be expressed as the identifying sequence BBAABABB, with each entry in the identifying sequence indicating a variant of a content segment. It is understood that the identifier may correspond to numerical or alphanumeric representations other than binary, e.g., decimal, hexadecimal. Accordingly, it is understood that a given content segment can correspond to more than two variants in order to facilitate expression of the identifying sequence.

Based on the identifying sequence, the edge device 128 may generate a manifest facilitating access, e.g., by the user device, to the requested content. Generating the manifest can comprise generating a manifest comprising entries identifying content segment variants according to the identifying sequence. For example, given the identifying sequence BBAABABB and a starting index(i) for content segments, the edge device 128 may generate a manifest having entries for content segments as B(i), B(i+1), A(i+2), A(i+3), B(i+4), A(i+5), B(i+6), B(i+7). As another example, given the identifying sequence BBAABABB and a starting index(i) for content segments, the edge device 128 can generate a manifest where every Nth segment corresponds to an entry in the identifying sequence, e.g., B(i), B(N+i), A(2N+i), A(3N+i), B(4N+i), A(5N+i), B(6N+i), B(7N+i).

Generating an entry in a manifest may include generating a duration parameter for the entry. The duration parameter may be based on a baseline duration of a given content segment expressed as a number of ticks of a clock. For example, the duration parameter for a two-second content segment should be based on two-seconds worth of "ticks" of a clock. For example, a two-second content segment would have a baseline duration of 180180 ticks of a 90 KHz clock, or 54054000 ticks of a 27 MHz clock. Generating the duration parameter for a given entry may include modifying the baseline duration by a random offset. The random offset can be generated based on one or more constraints, such as an upper bound or a lower bound. The constraints can be based on a clock speed. For example, the constraints can be based on a degree of precision of a clock speed at which the duration parameter is expressed relative to a clock speed of a clock used in time-based addressing of content segments. For example, assume content segments are addressed using time-based addressing according to a 90 KHz clock, while the duration parameters in the manifest are expressed according to a 27 MHz clock. The 90 KHz addresses T can be expressed as 27 MHz values by the formula T*300+ext, where ext is a nine-bit value between 0 and 299. The value ext may be assigned as the random offset, constrained between [−149 and 149]. Thus, the resulting probability in identifying an A or B variant as indicated in the manifest is 1/298.

In an example, one or more least significant bits of the duration parameter may be fixed to correspond to a variant of the given segment according to the identifying sequence. For example, given an A variant and a B variant of a given content segment, after applying the random offset to a baseline duration, the least significant bit of the duration parameter may be fixed as 0 if the respective entry corresponds to an A variant of a content segment. As another example, the least significant bit of the duration parameter can be fixed as 1 if the respective entry corresponds to a B variant of a content segment. If content segments correspond to more than two variants, it is understood that more than one least significant bit can be fixed to indicate a respective variant of a content segment. For example, if content segments correspond to four variants, two least significant bits can be fixed to indicate one of the respective variants.

In examples in which not every content segment is used to encode the identifying sequence, e.g., when every Nth content segment corresponds to an entry in the identifying sequence, the duration parameters for content segments other than the Nth content segment may be based on the random offset. However, the duration parameters for content segments other than the every Nth content segment need not have one or more least significant bits set to indicate a particular variant. For example, content segments other than the every Nth content segment may only have one variant.

The manifest may be transmitted to the user device. The manifest may be transmitted to the user device after generating the manifest based on the identifying sequence. Thus, the user device, using the manifest, requests content segment variants according to the identifying sequence. In an example, the edge device 128 may receive a request for a content segment. The request can include a time value generated by the user device based on the duration parameter indicated in the manifest. This time value facilitates determining a requested content segment based on a time-based addressing scheme. The edge device 128 can determine one or more least significant bits of the time value, and select a variant of a requested content segment based on the one or more least significant bits. For example, if the least significant bit of the time value is 0, the edge device may select the "A" variant of a requested content segment. If the least significant bit of the time value is 1, the edge device 128 can select the "B" variant of the requested content segment.

In an example, the edge device 128, or another device, may identify a content segment having a plurality of variants. One of the variants of the plurality of variants having a greatest data size may be identified. Variants other than the one having the greatest data size can be modified until their resulting data size equals the variant having the greatest data size. This can include adding one or more Network Abstraction Layer (NAL) units to a given variant. This may also include adding one or more segment enhancement information (SEI) messages to a given variant. By equalizing the data size of each variant of a given content segment, it increases the difficulty of identifying particular content segment variants, or identifying that a content segment has multiple variants, thereby adding to the complexity of a collusion attack against a given content item.

For example, a user may have access to multiple copies of a content item each encoded with a different identifying sequence. When comparing corresponding segments of the multiple copies of the content items, a difference in data size in particular content segments would indicate that the particular content segment has multiple variants, and therefore may be used in watermarking the content item. By identifying these content segments, a user can remove or compromise the integrity of the identifying sequence by removing, modifying, or substituting the content segments used in the identifying sequence. By ensuring that all variants of a particular content segment are of a same size, a user cannot readily identify content segments used in an identifying sequence by comparing the data size of corresponding content segments of multiple copies of a given content item.

In an example, the network 116 may comprise a network component 129. The network component 129 may comprise any device, module, and/or the like communicatively coupled to the network 116. For example, the network component 129 can comprise a router, a switch, a splitter, a packager, a gateway, an encoder, a storage device, a multiplexer, a network access location (e.g., tap), physical link, and/or the like.

Figure 2A:
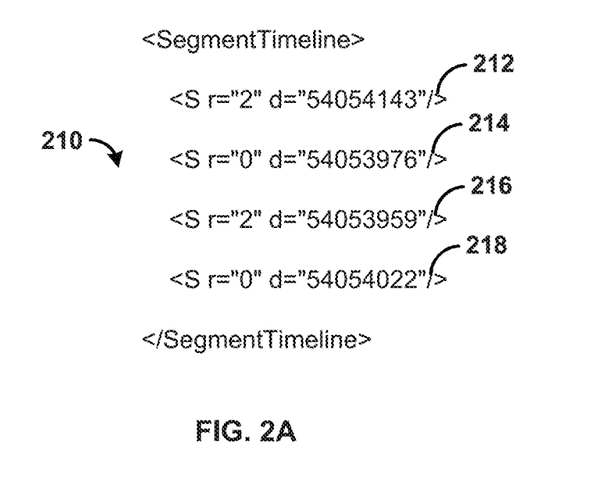
FIG. 2A is an example manifest.

FIG. 2A is an example manifest 210 using modified duration parameters to obfuscate an identifying sequence encoded into a transmission of content segments. This manifest 210 assumes two-second content segments with duration parameters calculated according to a 27 MHz dock. Thus, each content segment referenced in the manifest has a duration parameter calculated as a function of a baseline duration of 54054000 ticks of the 27 MHz clock. Here, the example manifest encodes a "BBBA" sequence of content segment variants, repeated twice. Manifest entry 212 includes a duration parameter of 54054143, calculated by adding, to the baseline duration of 54054000, a random offset. The random offset can be determined according to a constraint based on the precision of the 27 MHz clock, e.g., [−149 to +149]. For example, the random offset can be determined to be 143. The duration parameter of the manifest entry 212 may be determined by fixing a value of the least significant bit to indicate a "B" variant. For example, the duration parameter of the manifest entry 212 may be determined by fixing the least significant bit to "1," indicating that a "B" variant of a requested content segment should be transmitted to a requesting user device. As an example, the random offset can be determined to be 142. When added to the baseline duration, the resulting duration parameter would be 54054142, which has a least significant bit of "0." Accordingly, the least significant bit can be fixed to "1," resulting in a final determined duration parameter of 5404143. The manifest entry 212 also includes a repeat, or "r," parameter of 2, indicating that the manifest entry is applicable to three content segments (an initial content segment, plus two repeated content segments). Thus, manifest entry 212 captures the "BBB" portion of the "BBBA" sequence of variants.

Manifest entry 214 includes a duration parameter of 54053976. Notably, the least significant digit of this duration parameter is "0," indicating that an "A" variant should be transmitted after a request, and thereby completing the "BBBA" sequence of variants. Manifest entries 216 and 218 are similar to manifest entries 212 and 214, respectively, but include duration parameters calculated according to different random offsets. As the least significant bit of the duration parameter of manifest entry 216 is "1" and as the repeat parameter is 2, manifest entry 216 still encodes a "BBB" portion of a "BBBA" sequence of content segment variants. As the least significant bit of the duration parameter of manifest entry 218 is "0," manifest entry 218 still encodes an "A" portion of a "BBBA" sequence of content segment variants.

Figure 2B:
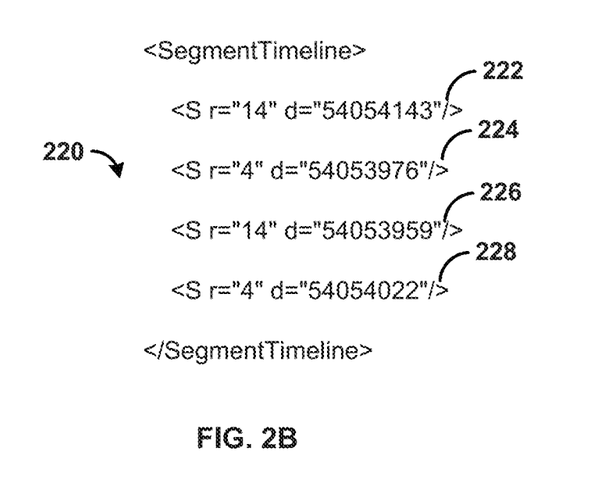
FIG. 2B is an example manifest.

FIG. 2B is an example manifest 220 using modified duration parameters to obfuscate an identifying sequence encoded into a transmission of content segments. This manifest 220 assumes two-second content segments with duration parameters calculated according to a 27 MHz clock. Thus, each content segment referenced in the manifest has a duration parameter calculated as a function of a baseline duration of 54054000 ticks of the 27 MHz clock. Here, the example manifest encodes a "BBBA" sequence of content segment variants, repeated twice, into every fifth content segment, e.g., into every Nth content segment, where N=5. Manifest entry 222 includes a duration parameter of 54054143, calculated by adding, to the baseline duration of 54054000, a random offset. The random offset may be determined according to a constraint based on the precision of the 27 MHz clock, e.g., [−149 to +149]. For example, the random offset can be determined to be 143. The duration parameter of the manifest entry 222 can be determined by fixing a value of the least significant bit to indicate a "B" variant. For example, the duration parameter of the manifest entry 222 can be determined by fixing the least significant bit to "1," indicating that a "B" variant of a requested content segment should be transmitted to a requesting user device. As an example, the random offset may be determined to be 142. When added to the baseline duration, the resulting duration parameter would be 54054142, which has a least significant bit of "0." Accordingly, the least significant bit can be fixed to "1," resulting in a final determined duration parameter of 5404143.

The manifest entry 222 also includes a repeat, or "r," parameter of 14, indicating that the manifest entry is applicable to fifteen content segments (an initial content segment, plus fourteen repeated content segments). As only every fifth content segment is used in encoding the identifying sequence, these fifteen content segments include three content segments capturing the "BBB" portion of the "BBBA" sequence of variants, and twelve content segments independent of the identifying sequence. The inclusion of content segment independent of the identifying sequence decreases the probability of a user identifying which content segments, if any, are used in a transmission of content to implement the identifying sequence.

Manifest entry 224 includes a duration parameter of 54053976 and a repeat parameter of 4, indicating its applicability to five content segments, one content segment reflecting the "A" variant of the "BBBA" identifying sequence, and four content segments independent of the identifying sequence. Manifest entries 226 and 228 are similar to manifest entries 222 and 224, respectively, but include duration parameters calculated according to different random offsets. As the least significant bit of the duration parameter of manifest entry 226 is "1" and as the repeat parameter is 14, manifest entry 226 still encodes a "BBB" portion of a "BBBA" sequence of content segment variants. As the least significant bit of the duration parameter of manifest entry 228 is "0," manifest entry 228 still encodes an "A" portion of a "BBBA" sequence of content segment variants.

Figure 3A:
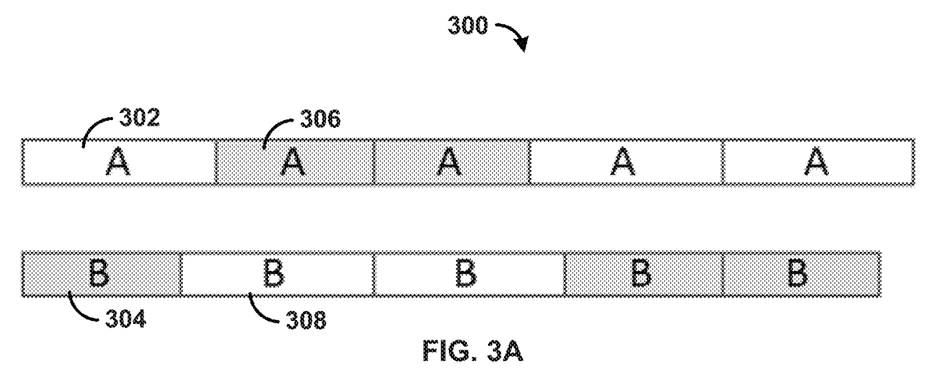
FIG. 3A is a timeline of content segment variants.

FIG. 3A is an example timeline 300. Here, each given content segment as both an "A" variant and a "B" variant. Although the "A" variant and the "B" variant of a given content segment correspond to the same portion of content, e.g., the same second of content, the same two seconds of content, or the same five seconds of content, minor variations in encodings may introduce a difference in data size between the "A" variant and "B" variant of the given content segment. For example, "A" variant content segment 302 is of greater data size than its corresponding "B" variant content segment 304. As another example, "A" variant content segment 306 is of lesser data size than its corresponding "B" variant content segment 308. This difference in data size creates a vulnerability through collusion attacks. For example, a user can have access to multiple copies of a content item, and can compare corresponding content segments across each copy of the content item. A difference in data size for a given content segment may indicate that the given content segment has multiple variants, which can be indicative of the given content segment being included in an identifying sequence for watermarking. Having identified content segments used in an identifying sequence, the user could substitute content segments from one version of the content item with corresponding content segments from other copies of the content item, potentially corrupting or compromising the identifying sequence.

Figure 3B:
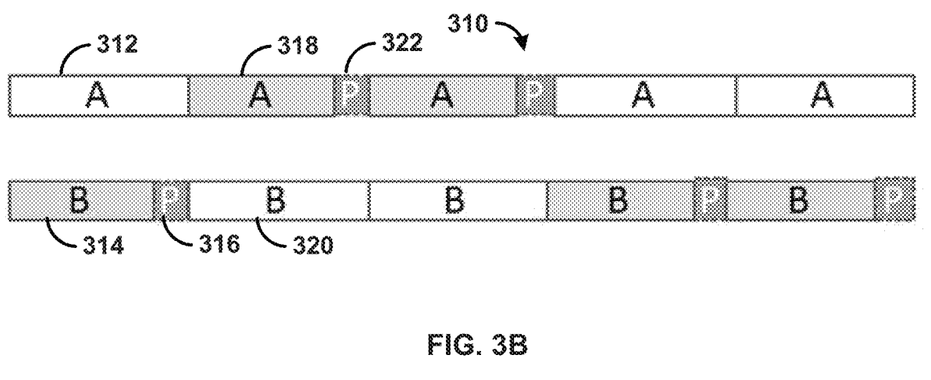
FIG. 3B is a timeline of padded content segment variants.

FIG. 3B is an example timeline 310. Here, "A" variant content segment 312 is of greater data size than its corresponding "B" variant content segment 314. However, padding 316 has been added to the "B" variant content segment 314, equalizing the data size of the "A" variant content segment 312 and the "B" variant content segment 314. As another example, "A" variant content segment 318 is of lesser data size than its corresponding "B" variant content segment 320. However, padding 322 has been added to the "A" variant content segment 318, equalizing the data size of the "A" variant content segment 318 and the "B" variant content segment 320. Padding 316 and padding 322 may include one or more of Network Abstraction Layer (NAL) units or one or more segment enhancement information (SEI) messages. Thus, the overall data size of a given content segment can be modified without affecting the renderable content data itself. This reduces the collusion attack vulnerability described with respect to FIG. 3A. For example, a user may have access to multiple copies of a content item, and can compare corresponding content segments across each copy of the content item. As corresponding content segments across the multiple copies of a content item are now of equal size, it becomes more difficult to determine if variants of the given content segment are used to encode an identifying sequence for the purpose of watermarking.

Figure 4:
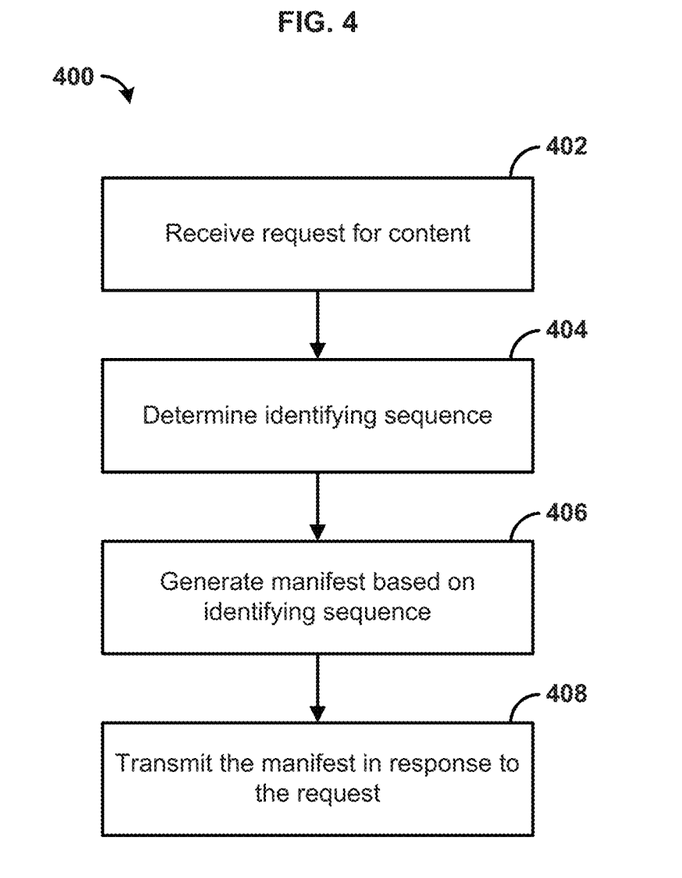
FIG. 4 is a flowchart of an example method.

FIG. 4 is a flowchart 400 of an example method. In step 402, a request for content may be received, e.g., by an edge device 128 and/or from a user device. The content may comprise a plurality of content segments. Each of the plurality of content segments may comprise a particular duration of content, e.g. one second of content, two seconds of content, or five seconds of content. Each of at least a subset of the plurality of content segments can correspond to a plurality of variants. For example, each of the plurality of content segments can correspond to a plurality of variants. As another example, every Nth content segment in the plurality of content segments can correspond to a plurality of variants, while content segments outside of the every Nth content segment only have one variant. For example, a given content segment may correspond to a first variant, or an "A" variant, and a second variant, or a "B" variant. It is understood that a given content segment can correspond to any quantity of variants. A plurality of variants of a given content segment each express the same portion of content, e.g., a same second of content, a same two seconds of content, or a same five seconds of content, but with some variation introduced to differentiate each variant. The variation can include a variation in motion vectors, color composition, audio composition, or other variation.

In an example, encoding of variants of a given content segment may result in different data sizes for each variant of the given content segment, even though the variants of the given content segment express the same portion of content. In an example, padding may be added to one or more variants of a given content segment such that each variant of the given content segment is of equal data size. Adding padding to a given content segment can include adding one or more of Network Abstraction Layer (NAL) units or one or more segment enhancement information (SEI) messages. Thus, the overall data size of the given content segment can be modified without affecting the renderable content data itself.

An identifying sequence associated with the request may be determined, e.g., by the edge device 128, at step 404. The identifying sequence associated with the request may be determined after the request for content. Determining an identifying sequence may include determining an identifier associated with the request. The identifier may serve to uniquely identify one or more of: a user associated with the request, a user device associated with the request, a source of the content, a time and/or date associated with the request, the content, or other data as can be appreciated. The identifier may then be expressed as the identifying sequence. Each entry in the identifying sequence may identify a variant type for the content segments. For example, the identifier may comprise a binary value. Each 0 of the binary value can correspond to one variant, e.g. "A," while each 1 of the binary value can correspond to another variant, e.g. "B." For example, the binary value 11001011 may be expressed as the identifying sequence BBAABABB, with each entry in the identifying sequence indicating a variant type of a content segment, e.g., "A" or "B."

At step 406, a manifest facilitating access, e.g., by the user device, to the requested content may be generated, e.g., by the edge device 128, according to the identifying sequence. Generating the manifest may comprise generating a manifest comprising entries identifying content segment variants according to the identifying sequence. For example, given the identifying sequence BBAABABB and a starting index (i) for content segments, the edge device 128 can generate a manifest having entries for content segments as B(i), B(i+1), A(i+2), A(i+3), B(i+4), A(i+5), B(i+6), B(i+7). As another example, given the identifying sequence BBAABABB and a starting index(i) for content segments, the edge device 128 can generate a manifest where every Nth segment corresponds to an entry in the identifying sequence, e.g., B(i), B(N+i), A(2N+i), A(3N+i), B(4N+i), A(5N+i), B(6N+i), B(7N+i).

While the examples described herein assume two variants, A and B, it is possible that more than two variants exist (e.g., A, B, C, and D), and more than one bit is expressed in a single variant segment. In the example above, A may correspond to a bit sequence '00', B to '01', C to '10', and D to '11'.

Generating an entry in a manifest may include generating a duration parameter for the entry. The duration parameter may be based on a baseline duration of a given content segment expressed as a number of ticks of a clock. For example, the duration parameter for a two-second content segment should be based on two-seconds worth of ticks of a clock. For example, a two-second content segment would have a baseline duration of 180180 ticks of a 90 KHz clock, or 54054000 ticks of a 27 MHz clock. Generating the duration parameter for a given entry may include modifying the baseline duration by a random offset. The random offset can be generated based on one or more constraints, such as an upper bound or a lower bound. The constraints can be based on a clock speed. For example, the constraints can be based on a degree of precision of a clock speed at which the duration parameter is expressed relative to a clock speed of a clock used in time-based addressing of content segments. For example, assume content segments are addressed using time-based addressing according to a 90 KHz clock, while the duration parameters in the manifest are expressed according to a 27 MHz clock. The 90 KHz addresses T can be expressed as 27 MHz values by the formula T*300+ext, where ext is a nine-bit value between 0 and 299. The value ext may be assigned as the random offset, constrained between [0 and 149]. Thus, the resulting probability in identifying an A or B variant as indicated in the manifest is 1/149.

In an example, one or more least significant bits of the duration parameter may be fixed to correspond to a variant of the given segment according to the identifying sequence. For example, given an A variant and a B variant of a given content segment, after applying the random offset to a baseline duration, the least significant bit of the duration parameter may be fixed as 0 if the respective entry corresponds to an A variant of a content segment. As another example, the least significant bit of the duration parameter can be fixed as 1 if the respective entry corresponds to a B variant of a content segment. If content segments correspond to more than two variants, it is understood that more than one least significant bit may be fixed to indicate a respective variant of a content segment. For example, if content segments correspond to four variants, two least significant bits can be fixed to indicate one of the respective variants.

In examples in which not every content segment is used to encode the identifying sequence, e.g., when every Nth content segment corresponds to an entry in the identifying sequence, the duration parameters for content segments other than the Nth content segment may be based on the random offset. However, the duration parameters for content segments other than the every Nth content segment need not have one or more least significant bits set to indicate a particular variant. For example, content segments other than the every Nth content segment may only have one variant.

At step 408, the manifest may be transmitted, e.g., by the edge device 128 to the user device. The manifest may be transmitted after the request. Thus, the user device, using the manifest, may request content segments, e.g., from the edge device 128. The requested content segments will correspond to the variants referenced by the identifying sequence. In an example, the edge device 128 can receive a request for a content segment. The request can include a time value generated by the user device based on the duration parameter indicated in the manifest. This time value facilitates determining the requested content segment according to a time-based addressing scheme. The edge device 128 may determine one or more least significant bits of the time value, and select a variant of a requested content segment based on the one or more least significant bits. For example, if the least significant bit of the time value is 0, the edge device can select the "A" variant of a requested content segment. If the least significant bit of the time value is 1, the edge device 128 can select the "B" variant of the requested content segment. If the requested content segment is independent of the identifying sequence, the content segment can be determined independent of the least significant bits. For example, if the requested content segment is independent of the identifying sequence, the requested content segment may only have one variant. Thus, the single variant of the requested content segment is determined and transmitted after the request.

Figure 5:
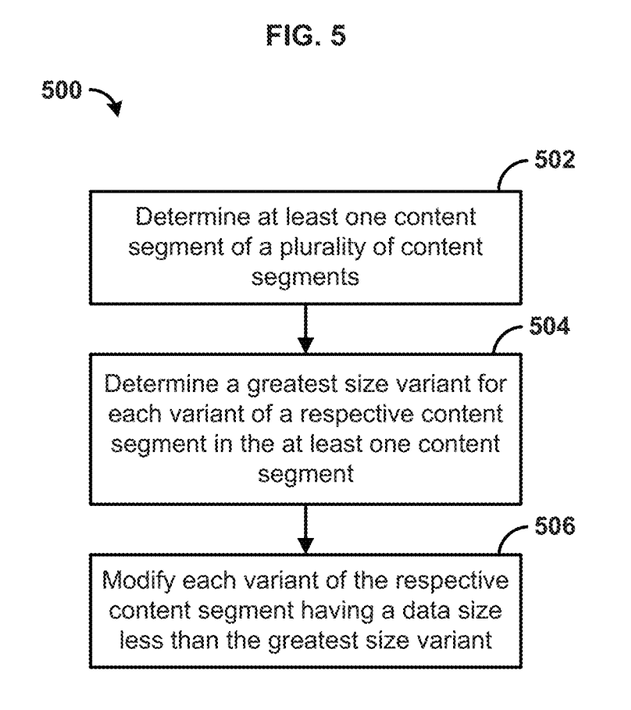
FIG. 5 is a flowchart of an example method.

FIG. 5 is a flowchart 500 of an example method. In step 502, at least one content segment of a plurality of contents may be determined, e.g., by an edge device 128. Each of the plurality of content segments may comprise a particular duration of content, e.g. one second of content, two seconds of content, or five seconds of content. Each of at least a subset of the plurality of content segments can correspond to a plurality of variants. For example, each of the plurality of content segments can correspond to a plurality of variants. As another example, every Nth content segment in the plurality of content segments may correspond to a plurality of variants, while content segments outside of the every Nth content segment only have one variant. For example, a given content segment can correspond to a first variant, or an "A" variant, and a second variant, or a "B" variant. It is understood that a given content segment can correspond to any quantity of variants. A plurality of variants of a given content segment each express the same portion of content, e.g., a same second of content, a same two seconds of content, or a same five seconds of content, but with some variation introduced to differentiate each variant. Accordingly, determining at least one content segment of the plurality of content segments may comprise determining, as the at least one content segment, those of the plurality of content segments having a plurality of respective variants.

At step 504, a greatest data size variant for each variant of a respective content segment in the at least one content segment is determined. Determining the greatest data size variant may include comparing the data size, e.g., in bits or bytes, of each variant of a given content segment to identify the greatest data size variant for the given content segment. At step 506, a data size for each variant of a respective content segment other than the greatest data size variant may be modified, e.g., by the edge device 128. Modifying the data size for a variant of the respective content segment can include adding one or more Network Abstraction Layer (NAL) units and/or one or more segment enhancement information (SEI) messages to the variant. The data size of the each variant other than the greatest data size version can be modified until each variant of the given content segment is of equal size. By equalizing the data size of each variant of a given content segment, it increases the difficulty of identifying the use of content segment variants by comparing the data sizes of corresponding content segments from different versions or instances of a content item, thereby adding to the complexity of a collusion attack against a given content item.

For example, a user may have access to multiple copies of a content item each encoded with a different identifying sequence. When comparing corresponding segments of the multiple copies of the content items, a difference in data size in particular content segments would indicate that the particular content segment has multiple variants, and therefore may be used in watermarking the content item. By identifying these content segments, a user can remove or compromise the integrity of the identifying sequence by removing, modifying, or substituting the content segments used in the identifying sequence. By ensuring that all variants of a particular content segment are of a same size, a user cannot readily identify content segments used in an identifying sequence by comparing the data size of corresponding content segments of multiple copies of a given content item.

Figure 6:
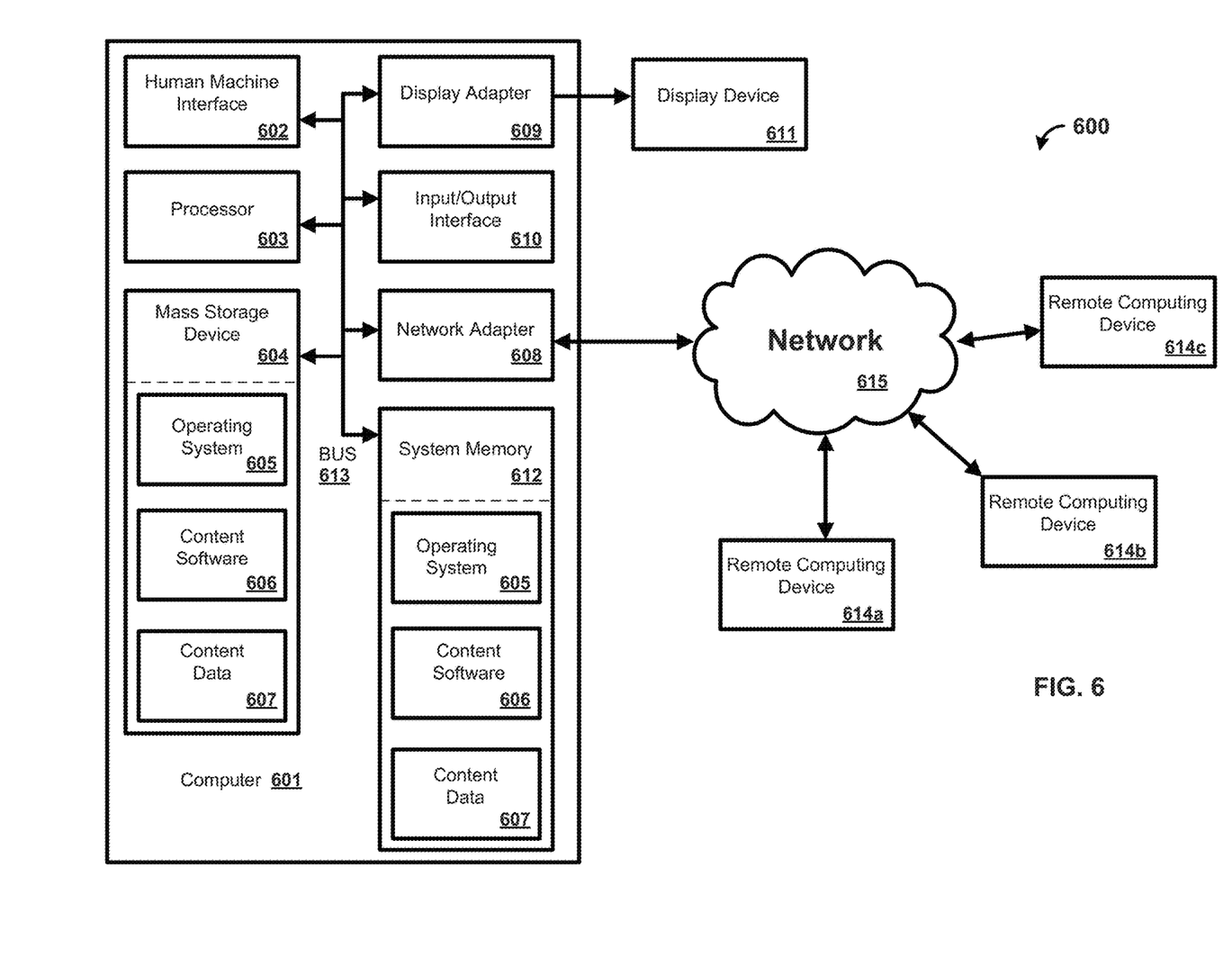
FIG. 6 is a block diagram of an example computing device.

The methods and systems may be implemented on a computer 601 as shown in FIG. 6 and described below. By way of example, the edge device 128 of FIG. 1 may be a computer as shown in FIG. 6. Similarly, the methods and systems described herein can utilize one or more computers to perform one or more functions in one or more locations. FIG. 6 is a block diagram showing an exemplary operating environment for performing the methods described herein. This exemplary operating environment is only an example of an operating environment and is not intended to suggest any limitation as to the scope of use or functionality of operating environment architecture. Neither should the operating environment be interpreted as having any dependency or requirement relating to any one or combination of components shown in the exemplary operating environment.

The present methods and systems may be operational with numerous other general purpose or special purpose computing system environments or configurations. Examples of well-known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the methods and systems described herein may be performed by software components. The systems and methods may be described in the general context of computer-executable instructions, such as program modules, being executed by one or more computers or other devices. Generally, program modules comprise computer code, routines, programs, objects, components, data structures, etc. that perform particular tasks or implement particular abstract data types. The methods described herein can also be practiced in grid-based and distributed computing environments where tasks are performed by remote processing devices that are linked through a communications network. In a distributed computing environment, program modules may be located in both local and remote computer storage media including memory storage devices.

Further, one skilled in the art will appreciate that the systems and methods described herein may be implemented via a general-purpose computing device in the form of a computer 601. The components of the computer 601 may comprise, but are not limited to, one or more processors 603, a system memory 612, and a system bus 613 that couples various system components including the one or more processors 603 to the system memory 612. The system may utilize parallel computing.

The system bus 613 represents one or more of several possible types of bus structures, including a memory bus or memory controller, a peripheral bus, an accelerated graphics port, or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 613, and all buses described herein may also be implemented over a wired or wireless network connection and each of the subsystems, including the one or more processors 603, a mass storage device 604, an operating system 605, content software 606, content data 607, a network adapter 608, the system memory 612, an Input/Output Interface 610, a display adapter 609, a display device 611, and a human machine interface 602, can be contained within one or more remote computing devices 614a,b,c at physically separate locations, connected through buses of this form, in effect implementing a fully distributed system.

The computer 601 typically comprises a variety of computer readable media. Exemplary readable media may be any available media that is accessible by the computer 601 and comprises, for example and not meant to be limiting, both volatile and non-volatile media, removable and non-removable media. The system memory 612 comprises computer readable media in the form of volatile memory, such as random access memory (RAM), and/or non-volatile memory, such as read only memory (ROM). The system memory 612 typically contains data such as the content data 607 and/or program modules such as the operating system 605 and the content software 606 that are immediately accessible to and/or are presently operated on by the one or more processors 603.

In another example, the computer 601 may also comprise other removable/non-removable, volatile/non-volatile computer storage media. By way of example, FIG. 1 shows the mass storage device 604 which may provide non-volatile storage of computer code, computer readable instructions, data structures, program modules, and other data for the computer 601. For example and not meant to be limiting, the mass storage device 604 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any quantity of program modules may be stored on the mass storage device 604, including by way of example, the operating system 605 and the content software 606. Each of the operating system 605 and the content software 606 (or some combination thereof) can comprise elements of the programming and the content software 606. The content data 607 may also be stored on the mass storage device 604. The content data 607 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple systems.

In another example, the user may enter commands and information into the computer 601 via an input device (not shown). Examples of such input devices comprise, but are not limited to, a keyboard, pointing device (e.g., a "mouse"), a microphone, a joystick, a scanner, tactile input devices such as gloves, and other body coverings, and the like These and other input devices can be connected to the one or more processors 603 via the human machine interface 602 that is coupled to the system bus 613, but can be connected by other interface and bus structures, such as a parallel port, game port, an IEEE 1394 Port (also known as a Firewire port), a serial port, or a universal serial bus (USB).

In yet another example, the display device 611 may also be connected to the system bus 613 via an interface, such as the display adapter 609. It is contemplated that the computer 601 may have more than one display adapter 609 and the computer 601 may have more than one display device 611. For example, the display device 611 can be a monitor, an LCD (Liquid Crystal Display), or a projector. In addition to the display device 611, other output peripheral devices can comprise components such as speakers (not shown) and a printer (not shown) which may be connected to the computer 601 via the Input/Output Interface 610. Any step and/or result of the methods can be output in any form to an output device. Such output can be any form of visual representation, including, but not limited to, textual, graphical, animation, audio, tactile, and the like. The display device 611 and computer 601 may be part of one device, or separate devices.

The computer 601 may operate in a networked environment using logical connections to one or more remote computing devices 614*a,b,c*. By way of example, a remote computing device can be a personal computer, portable computer, smartphone, a server, a router, a network computer, a peer device or other common network node, and so on. Logical connections between the computer 601 and a remote computing device 614*a,b,c* can be made via a network 615, such as a local area network (LAN) and/or a general wide area network (WAN). Such network connections can be through the network adapter 608. The network adapter 608 may be implemented in both wired and wireless environments. Such networking environments are conventional and commonplace in dwellings, offices, enterprise-wide computer networks, intranets, and the Internet.

Application programs and other executable program components such as the operating system 605 are shown herein as discrete blocks, although it is recognized that such programs and components reside at various times in different storage components of the computing device 601, and are executed by the one or more processors 603 of the computer. An implementation of the content software 606 may be stored on or transmitted across some form of computer readable media. Any of the methods described herein can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which may be accessed by a computer.

The methods and systems may employ Artificial Intelligence techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice described herein. It is intended that the specification and examples be considered as exemplary only, with a true scope and spirit being indicated by the following claims.

What is claimed is:

1. A method comprising:
receiving a request for content comprising a plurality of content segments, wherein at least one content segment of the plurality of content segments is associated with at least one variant of a plurality of variants;
determining an identifying sequence for the plurality of content segments, wherein the identifying sequence indicates, for the at least one content segment, the at least one variant;
determining, based on the identifying sequence, a manifest file configured to facilitate access to the content, wherein the manifest file comprises a duration parameter for the at least one content segment, and wherein the duration parameter indicates, for the at least one content segment, the at least one variant; and
sending the manifest file.

2. The method of claim 1, further comprising determining, based on at least one constraint, a random offset, wherein the duration parameter is based on the random offset.

3. The method of claim 2, wherein the at least one constraint is based on a clock speed.

4. The method of claim 1, wherein, a least significant bit of the duration parameter indicates the at least one variant.

5. The method of claim 1, further comprising:
receiving a first request for a first content segment of the plurality of content segments, wherein the first content segment is identified by a time value in the first request;
determining, for the first content segment, and based on the time value, a first variant of the plurality of variants; and
sending the first variant of the first content segment.

6. The method of claim 5, wherein determining the first variant comprises determining, for the first content segment, and based on a least significant bit of the time value, the first variant.

7. The method of claim 5, wherein the time value is based on the duration parameter for the first content segment.

8. The method of claim 1, wherein each variant of the plurality of variants comprises: a same portion of a corresponding content segment and at least one variation, and wherein the at least one variation differentiates each variant of the plurality of variants.

9. The method of claim 8, wherein the at least one variation is based on at least one of: a motion vector, a color composition, or an audio composition.

10. A method comprising:
   determining, based on a request for a plurality of content segments of content, a manifest file configured to facilitate access to the content, wherein the manifest file is based on an identifying sequence for the plurality of content segments that indicates, for at least one content segment of the plurality of content segments, at least one variant of a plurality of variants, wherein the manifest file comprises a duration parameter for the at least one content segment, and wherein the duration parameter indicates, for the at least one content segment, the at least one variant; and
   sending the manifest file.

11. The method of claim 10, further comprising determining, for the at least one content segment, based on a random offset, the duration parameter.

12. The method of claim 11, wherein a least significant bit of the random offset identifies the at least one variant.

13. The method of claim 10, further comprising:
   receiving a first request for a first content segment of the plurality of content segments, wherein the first content segment is identified by a time value in the first request;
   determining, for the first content segment, and based on the time value, a first variant of the plurality of variants; and
   sending the first variant of the first content segment.

14. The method of claim 13, wherein determining the first variant comprises determining, for the first content segment, and based on a least significant bit of the time value, the first variant.

15. The method of claim 10, wherein the identifying sequence for the plurality of content segments is based on an identifier associated with the request, and wherein the identifier is associated with at least one of: a user device associated with the request, a source of the content, a time associated with the request, or a date associated with the request.

16. A method comprising:
   receiving a request for content comprising a plurality of content segments, wherein at least one content segment of the plurality of content segments is associated with at least one variant of a plurality of variants;
   determining an identifying sequence for the plurality of content segments, wherein the identifying sequence indicates, for the at least one content segment, the at least one variant; and
   sending a duration parameter associated with the at least one content segment, wherein the duration parameter indicates, for the at least one content segment, the at least one variant.

17. The method of claim 16, further comprising determining, for the at least one content segment, and based on at least one constraint, a random offset for the duration parameter.

18. The method of claim 17, wherein the at least one constraint is based on a clock speed.

19. The method of claim 16, further comprising:
   receiving a first request for a first content segment of the plurality of content segments, wherein the first content segment is identified by a time value in the first request; and
   sending, based on the time value, a first variant of the first content segment.

20. The method of claim 16, wherein each variant of the plurality of variants comprises: a same portion of a corresponding content segment and at least one variation, wherein the at least one variation differentiates each variant of the plurality of variants, and wherein the at least one variation is based on at least one of: a motion vector, a color composition, or an audio composition.

* * * * *